(12) United States Patent
Gabriel et al.

(10) Patent No.: US 10,544,932 B2
(45) Date of Patent: *Jan. 28, 2020

(54) APPARATUS AND METHOD EMBEDDING A CAMERA IN AN LED STREETLIGHT

(71) Applicant: Clairvoyance, LLC, Charlestown, Nevis (KN)

(72) Inventors: Wilfried Gabriel, Frastanz (AT); Gerhard Eberl, Eisenstadt (AT)

(73) Assignee: Clairvoyance, LLC, West Indies ( * ) Notice: Subject to any disclaimer, the term of this patent is extended or adjusted under 35 U.S.C. 154(b) by 0 days.

This patent is subject to a terminal disclaimer.

(21) Appl. No.: 16/109,027

(22) Filed: Aug. 22, 2018

(65) Prior Publication Data

US 2018/0363894 A1 Dec. 20, 2018

Related U.S. Application Data

(63) Continuation of application No. 15/985,193, filed on May 21, 2018, now Pat. No. 10,094,551, which is a
(Continued)

(51) Int. Cl.
*F21V 33/00* (2006.01)
*F21S 8/08* (2006.01)
(Continued)

(52) U.S. Cl.
CPC .......... *F21V 33/0052* (2013.01); *F21S 8/086* (2013.01); *F21S 8/088* (2013.01); *F21V 11/16* (2013.01);
(Continued)

(58) Field of Classification Search
CPC combination set(s) only.
See application file for complete search history.

(56) References Cited

U.S. PATENT DOCUMENTS 5,886,738 A 3/1999 Hollenbeck et al.
6,141,037 A 10/2000 Upton et al.
(Continued)

FOREIGN PATENT DOCUMENTS

CN 202561635 U 11/2012
CN 202580961 U 12/2012
(Continued)

OTHER PUBLICATIONS

Written Opinion and Search Report for Singapore Patent Application No. 11201610542X with a date of completion of Sep. 22, 2017.
(Continued)

*Primary Examiner* — Janese Duley
(74) *Attorney, Agent, or Firm* — Katten Muchin Rosenman LLP

(57) ABSTRACT

Apparatus and method embedding a camera in a street light includes structure and/or function whereby the street light has a first compartment having an LED array configured to illuminate an area beneath the street light. A second compartment is coupled to the first compartment and has a camera directed toward the area beneath the street light. A third compartment is coupled to the second compartment and is configured to attach the street light to a vertical support. A passive air channel is disposed between the first compartment and the second compartment, and is configured to direct air from beneath the street light to the top of the street light. Preferably, the power supply for the LED array is disposed in a compartment different than the first compartment.

22 Claims, 9 Drawing Sheets

Related U.S. Application Data continuation of application No. 14/576,872, filed on Dec. 19, 2014, now abandoned.

(60) Provisional application No. 62/012,648, filed on Jun. 16, 2014.

(51) Int. Cl.

| | |
|---|---|
| *F21V 11/16* | (2006.01) |
| *F21V 23/02* | (2006.01) |
| *F21V 29/83* | (2015.01) |
| *H04N 7/18* | (2006.01) |
| *H04N 5/225* | (2006.01) |
| *F21V 21/116* | (2006.01) |
| *G08B 13/196* | (2006.01) |
| *G08B 15/00* | (2006.01) |
| *F21Y 105/10* | (2016.01) |
| *F21Y 115/10* | (2016.01) |
| *F21V 23/04* | (2006.01) |
| *F21W 131/103* | (2006.01) |

(52) U.S. Cl.
CPC .......... *F21V 21/116* (2013.01); *F21V 23/023* (2013.01); *F21V 29/83* (2015.01); *G08B 13/19632* (2013.01); *G08B 15/001* (2013.01); *H04N 5/2252* (2013.01); *H04N 7/183* (2013.01); *F21V 23/0435* (2013.01); *F21W 2131/103* (2013.01); *F21Y 2105/10* (2016.08); *F21Y 2115/10* (2016.08); *G08B 13/1966* (2013.01)

(56) References Cited

U.S. PATENT DOCUMENTS

| | | |
|---|---|---|
| 6,456,322 B1 | 9/2002 | Marinacci |
| 6,462,775 B1 | 10/2002 | Loyd et al. |
| 6,624,845 B2 | 9/2003 | Loyd et al. |
| 7,369,056 B2 | 5/2008 | McCollough, Jr. |
| 7,399,127 B2 | 7/2008 | Hirafuji et al. |
| 7,731,383 B2 | 6/2010 | Myer |
| 7,819,555 B2 | 10/2010 | Yu |
| 8,029,154 B2 | 10/2011 | Myer |
| 8,040,102 B2 | 10/2011 | Kao et al. |
| 8,382,387 B1 | 2/2013 | Sandoval |
| 8,558,413 B1 | 10/2013 | Lepard |
| 8,586,902 B2 | 11/2013 | Verfuerth |
| 8,599,254 B2 | 12/2013 | Zittel |
| 8,622,561 B2 | 1/2014 | Carmody |
| 8,641,241 B2 | 2/2014 | Farmer |
| 8,866,582 B2 | 10/2014 | Verfuerth et al. |
| 9,046,235 B2 | 6/2015 | Wilson |
| 9,554,099 B1 | 1/2017 | Dursch |
| 2002/0154218 A1 | 10/2002 | Loyd et al. |
| 2005/0116838 A1 | 6/2005 | Bachelder et al. |
| 2005/0265050 A1 | 12/2005 | Miller |
| 2008/0316743 A1 | 12/2008 | Shaneour |
| 2011/0134239 A1 | 6/2011 | Vadai et al. |
| 2011/0141727 A1 | 6/2011 | Kim |
| 2012/0025711 A1 | 2/2012 | Best et al. |
| 2012/0147604 A1 | 6/2012 | Farmer |
| 2012/0184885 A1 | 7/2012 | Khan |
| 2012/0243231 A1 | 9/2012 | Vadai et al. |
| 2014/0078308 A1 | 3/2014 | Veifuerth |

FOREIGN PATENT DOCUMENTS

| | | |
|---|---|---|
| EP | 2 618 450 A1 | 7/2013 |
| JP | H07-146502 A | 6/1995 |
| JP | 2001035246 A | 2/2001 |
| KR | 101056018 B1 | 8/2011 |
| KR | 200 460 104 Y1 | 5/2012 |
| WO | 2004/095386 A1 | 11/2004 |
| WO | 2013/077598 A1 | 5/2013 |

OTHER PUBLICATIONS

International Search Report and Written Opinion of the International Searching Authority for International Application No. PCT/EP2014/003468 dated Dec. 15, 2015.
International Preliminary Report on Patentability for International Application No. PCT/EP2014/003468 dated Dec. 29, 2016.
Office Action for European Patent Application No. 14 892 227.1 dated Jan. 25, 2018.
Third party Observation for European Application No. 14892227.1 faxed to the European Patent Office on Apr. 18, 2018.
U.S. Appl. No. 61/864,720 to Wilson, filed Aug. 12, 2013.
Office Action for Chinese Patent Application No. 201480081152.7 dated Oct. 8, 2018.

APPARATUS AND METHOD EMBEDDING A CAMERA IN AN LED STREETLIGHT

This application is a continuation of U.S. patent application Ser. No. 15/985,193, filed May 21, 2018, which is a continuation of U.S. patent application Ser. No. 14/576,872, filed Dec. 19, 2014 (now abandoned), which claims priority to U.S. Patent Appln. No. 62/012,648, filed Jun. 16, 2014, the contents of all incorporated herein by reference.

BACKGROUND OF THE INVENTION

1. Field of the Invention.

The present invention relates to apparatus and method whereby a camera mounted in an LED streetlight is enabled to monitor a field of view and report what is observed. In a preferred embodiment, a fixed camera and/or a Pan-Tilt-Zoom (PTZ) camera is used, and it is remotely controlled by, and communicates image(s) and/or reports to, a remote control center via one or more of wireless (e.g., WiFi, WiMax, Bluetooth, satellite, etc.) and/or land-line (e.g., coaxial cable, Ethernet, etc.) modalities. Preferably, the camera is not visible from the area monitored.

2. Background Art.

Street lights are found all over the world. They are used to light public roads, paths, and areas during night time, and to provide safety to the citizens and visitors of such areas. Cameras may be installed in such street lights to view the areas below the streetlight, thus providing security to the public and providing police visual monitoring capabilities. The video and/or still images are typically uploaded to one or more monitoring servers via wireless and/or land-line. Where a PTZ camera is used, the camera motions and image-capture can be controlled via the same or different servers via the wireless and/or land-line connection.

For example, U.S. Pat. No. 5,886,738 discloses a PTZ camera installed in a street light. However, the heat-generating Halogen bulb 673 (FIG. 6B) is located adjacent the camera 650, thus requiring a fan 687 to cool the equipment. Even with the fan, overheating of the camera and light components is a problem.

As another example, U.S. Patent Publication No. 2011/0141727 discloses a street light having a camera module 2230 surrounded by lamp bulb modules 2220 (FIG. 3A, 3B). Beside the overheating problems engendered by such a design, the light from the lamp bulbs will likely enter onto the camera module, resulting in improperly-exposed video/pictures.

Thus, what is needed is an efficient street lamp/camera design which overcomes the problems of the known art, and provides a safe, cost-efficient design.

SUMMARY OF THE INVENTION

According to a first aspect of the present invention, apparatus and method embedding a camera in a street light includes structure and/or function whereby the street light has a first compartment having an LED array configured to illuminate an area beneath the street light. A second compartment is coupled to the first compartment and has a camera directed toward the area beneath the street light. The second compartment has a window covering the camera such that the camera can receive light from area beneath the street light, but passers-by do not see the camera. A third compartment is coupled to the second compartment and is configured to attach the street light to a vertical support. A passive air channel is disposed between the first compartment and the second compartment, and is configured to direct air from beneath the street light to the top of the street light. Preferably, the power supply for the LED array is disposed in a compartment different that the first compartment. An anti-glare device is preferably mounted to a bottom of at least one of the first compartment and the second compartment, and is configured to shield the camera from light glare and/or reflections from the LED array.

According to a second aspect of the present invention, a method of imaging a lighted area from a streetlight, includes illuminating an area below the streetlight with an LED light array disposed in an LED light compartment of an enclosure. An image of the illuminated area below the streetlight is captured with a camera mounted in a camera compartment coupled to the LED light compartment. The LED light compartment is cooled by providing at least one passive cooling air channel between the LED light compartment and the camera compartment, from a bottom of the enclosure to a top thereof. Light from the LED array is shielded from entering a lens of the camera using a shield device. Power to the LED light array and to the camera is provided from circuitry disposed in a power supply compartment of the enclosure. The enclosure is supported on a streetlight support structure.

DETAILED DESCRIPTION OF THE PRESENTLY PREFERRED EXEMPLARY EMBODIMENTS

1. Introduction

Figure 1:
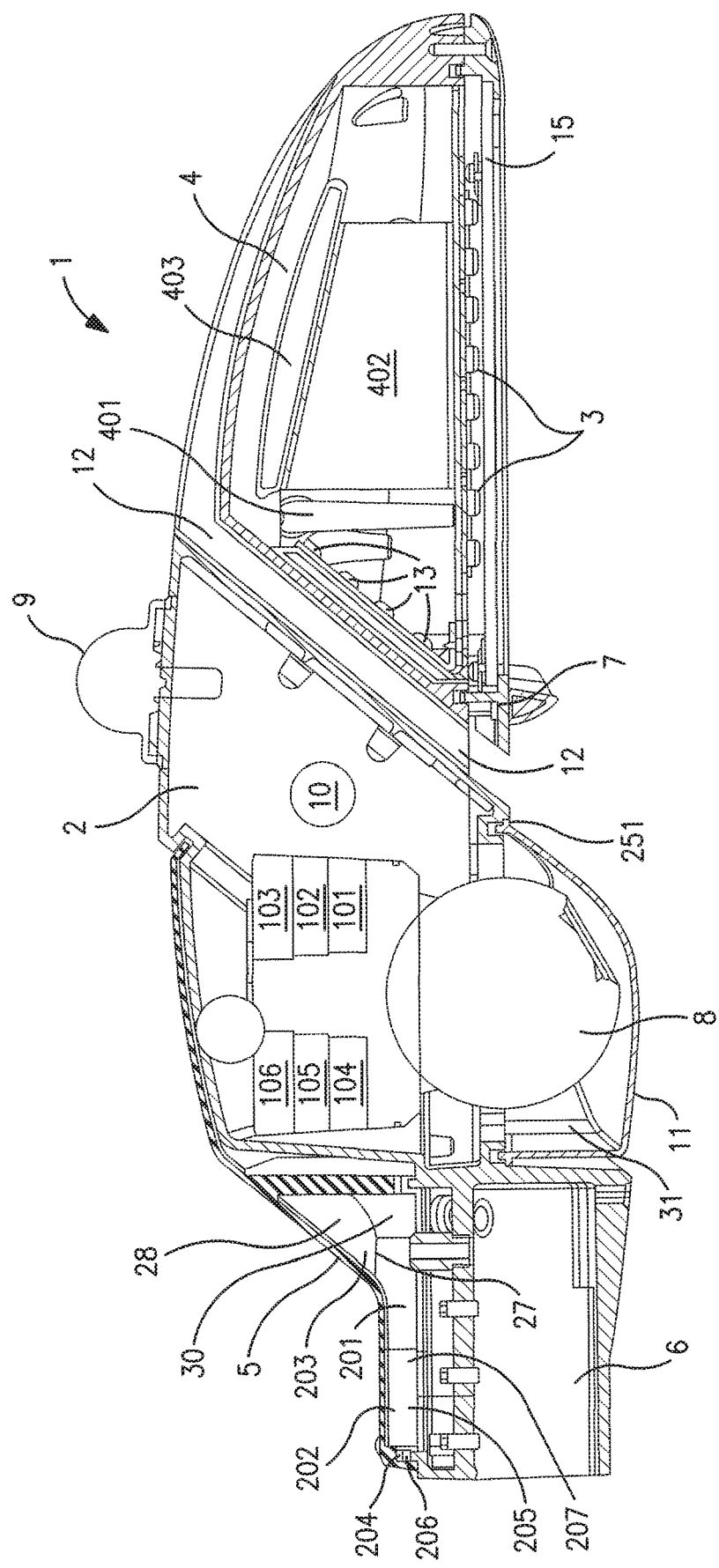
FIG. 1 is a schematic cross-sectional view of the presently preferred exemplary embodiment taken along line 1-1 of FIG. 2.

The presently preferred exemplary embodiments provide a unique combination of features whereby a fixed and/or PTZ camera is mounted in a street light enclosure, in a compartment separate from the LED light compartment. With this design, heat-generation is properly managed, and the lighting functions will not interfere with the camera functions. Preferably, the fixed and/or PTZ camera lens is mounted beside but vertically below the LED compartment to prevent light pollution to the camera. As a further aid in lighting control, an anti-glare spoiler may be mounted between the light compartment and the camera compartment, to shield the camera from the light. To properly manage the generated heat, the heat-generating components of the LED lights are preferably located remotely from the LED compartment. Additionally, a passive-cooling air channel is preferably disposed between the camera compartment and the LED compartment, sloping upward from the bottom of the street lamp to the top thereof Of course, many alternative designs and devices may be adapted for use in the present invention without departing from the present disclosure and the claims. For example, the light(s) may be incandescent, Halogen, or any other acceptable light source. The camera(s) may be fixed, pan-only, tilt-only, zoom-only, or any combination thereof. The passive air cooling channel may be vertical, and/or may slope in a forward direction or a reverse direction, or any combination thereof. Active air cooling structure (e.g., one or more fans) may be installed in or near the air channel, or in one or more other locations. The heat-generating components may be installed in the camera compartment and/or in the compartment which is used to attach the street light to a vertical support (such as a pole or a wall). Further, such heat-generating components (and other electrical devices) may be installed in the tubing which is used to attach the street light to the vertical support. Several presently-preferred exemplary embodiments will now be described below.

2. Glossary

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to" and "coupled with" as used herein, each mean a relationship between or among two or more devices, apparatuses, files, circuits, elements, functions, operations, processes, programs, media, components, networks, systems, subsystems, and/or means, constituting any one or more of (i) a connection, whether direct or through one or more other devices, apparatuses, files, circuits, elements, functions, operations, processes, programs, media, components, networks, systems, subsystems, or means, (ii) a communications relationship, whether direct or through one or more other devices, apparatuses, files, circuits, elements, functions, operations, processes, programs, media, components, networks, systems, subsystems, or means, and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an email, a message, a document, a report, or a list, or in any other form.

The term "network" as used herein includes both networks and inter-networks of all kinds, including the Internet, Local Area Networks, Wide Area Networks, etc., and is not limited to any particular network or inter-network.

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computers, personal computers, CPUs, ASICS, PLC's, hardwired circuits, signal modifying devices and systems, devices, and machines for controlling systems, central processing units, programmable devices, and systems, field-programmable gate arrays, application-specific integrated circuits, systems on a chip, systems comprised of discrete elements and/or circuits, state machines, virtual machines, data processors, processing facilities, and combinations of any of the foregoing.

3. Structure

Referring to FIG. 1, the streetlight apparatus 1 has a modular design preferably comprising a first compartment 2, a second compartment 4, and a third compartment 5, which together provide a weather proof enclosure. Each compartment may have its own interior and/or exterior weatherproofing and/or thermal insulation, such as interior and/or exterior powdered coatings, composite coatings, spray coatings, etc.

The first compartment 2 preferably contains: (i) a fixed-dome and/or PTZ camera device 8; (ii) a glass and/or polycarbonate camera window 11, (iii) mechanical and electrical drive linkages 101 (shown in schematic) for the camera 8; (iv) an antenna 9 for transmitting/receiving signals to/from the camera 8 to/from a remote control center; (v) a transceiver 102 for supplying signals to/from the antenna 9; (vi) one or more processors 103 for controlling the operations of the camera 8, the transceiver 102, and the LED array 3; (vii) one or more memory storage devices 104 preferably comprising Read-Only-Memory containing computer program code, which, when executed by the one or more processors, carries out the functions described herein, Random-Access-Memory for storing data used by the one or more processors in execution of the program code, and data storage which may, for example, store camera video for a given period of time, e.g., one day, one week, one month, one year, or any increments thereof; (viii) an optional heating device 105; (ix) an optional cooling device (e.g., fan) 106; and (x) a mechanical interface 6 for mounting the streetlight apparatus 1 on a pole, column, lamp post, and/or bracket.

The streetlight apparatus 1 also comprises the second compartment 4, which preferably contains: (i) the LED array 3 (e.g., a 8×6 matrix of LEDs, a printed circuit board, LED circuitry, lenses, etc.); (ii) a flat glass and/or polycarbonate LED array cover 15; and (iii) an anti-glare spoiler device 7 mounted on the bottom part of the apparatus, preferably substantially orthogonal to the bottom surface, and which acts to protect the camera 8 from light glare and/or reflections from the LED array 3, and also provides some lateral protection to both the camera 8 and the LED array 3 from wind and/or rain. Further, the device 7 acts as an "air-scoop" to direct air upward through a channel 12, which will be described in greater detail below. The device 7 may contain one or more bottom-mounted antennas, which, if used in conjunction with the top-mounted antenna 9, gives all-around antenna coverage. Note that since the LED array power supply is preferably disposed in the compartment 2 or compartment 5, the heat generated thereby will not adversely impact the LED array 3. Further, since the heavier components of the apparatus 1 are disposed in the compartments 2 and/or 5, the mechanical coupling 6 may be made lighter and more secure. To further improve heat management, an aluminum block 402 (hollow and/or solid) may be mounted over top of the LED array 3 to act as a heat sink. The block 402 may have a top piece 403.

The third compartment 5 preferably couples to the top of the mechanical interface 6, and is configured to hold: (i) gears and drives; (ii) the Lighting Control Unit (LCU) 28; (iii) preferably one or more power supplies 30 for the LED array 3 (which may include LED SMPS smart power supply 201); (iv) the camera power supply 202; (v) radio device power supplies 203, etc.; and (vi) connector terminals 204 for the SMPS, the camera power supply, the LED power supply, and the LCU 28.

Between the compartment 2 and the compartment 4 is a passive air-cooling channel 12. It has been found that LED lighting for streets, areas, and industrial uses has advantages and disadvantages. The most pronounced disadvantage is the necessity of careful thermal management. The present invention is designed to operate in critical and sensitive environments in outdoor applications. In general, ambient temperatures beyond 35° C. are the most critical environment for LED street light applications. The present invention is designed for ambient temperatures up to +50 degrees C. There are areas on our planet where such temperatures are likely to exist, even by sunset when street lights are switched on. The present invention preferably separates the LED power supply (in the compartment 5 and/or 2) from the actual LED array 3 and its compartment 4. Furthermore, the street light apparatus is designed to provide a constant air stream (passive cooling) through channel 12, preferably from the in-board bottom of compartment 4 to the out-board top of that compartment. As shown in FIG. 1, the channel 12 slopes at an approximate 45 degree angle from the in-board side of the apparatus 1 toward the out-board side thereof. Of course, any reasonable and convenient angle of air the air channel 12 may be used, such as 90 degrees, 60 degrees, 30, 15 degrees, or any angle in between.

For additional thermal management, the LED array 3 is preferably directly mounted by several mechanical interfaces 13 to the compartment 2, providing optimized thermal heat dissipation. In addition, a powder-coating material is preferably used to cover the outsides of the compartments 2, 4, and/or 5, to decrease heating by the sun.

As described above, the LED power supply 30 (FIG. 1) is preferably mounted inside the compartment 5, although it may be provided (in whole or in part) on one or more portions of the pole mounting unit 19 (FIG. 8), or in compartment 2. Using the thermal management techniques described above, the cooling performance shows a cool and stable temperature environment for the LED array 3 in the compartment 4. Additionally, the LED array 3 is preferably supplied with a temperature sensor 401 to monitor the operating temperature of the array and/or inside the compartment 4. In case of overheating, the LED array 3 is preferably switched into an autonomous dimming mode (by the LED power supply 30) to prevent malfunctioning of the system. The dimming mode may reduce the light output of the LED array 3 by 10%, 20%, 30%, 40%, 50%, 60%, 70%, 80%, 90%, 100%, or any percentage therebetween.

Ambient temperatures below −25 degrees C. are also foreseeable. In such cases, the compartment 5 provides constant insulation for electronic components being operated below their individual manufacturer temperature specifications. For example each compartment may be a self-contained compartment which may be lined with one or more layers of insulation. Additionally, one or more heating devices 105 may be provided in one or more of compartments 2, 4, and/or 5.

4. Functions

One or more cameras 8 are preferably used to integrate live video streams into complex video surveillance systems that monitor defined areas for traffic-control, security, etc. The camera 8 may also include or be accompanied by one or more microphones 31. Thus, integrated video/audio streams may be provided to one or more control centers, such as traffic management, security, entertainment, etc.

The radio antenna 9 is preferably used for broadband communication and is preferably mounted on the top of the camera compartment 2. The antenna 9 is preferably connected to the camera 8 through the transceiver radio device 10. The antenna 9 and/or the antenna 7 preferably communicate with a base station located in the area. The communication between the base station and the street light antenna(s) may be by way of wireless cellular (voice and/or SMS text, and/or MMS data), WiFi (e.g., IEEE 802.11 systems), WiMax, Bluetooth, etc. In addition (or alternatively) such communication may be by way of land-line cable and/or Ethernet via the street light pole, preferably alongside of the electric cables bringing power to the LED array 3.

The apparatus 1 preferably has an integrated broadband radio device 10 (RF CPE—Radio Frequency Customer Premises Equipment) to connect the apparatus 1 and the column/pole's or lamp post's applications (if any) via base stations to the world wide web in order to communicate with the system globally.

In order to provide an ideal technical solution for the video surveillance application, an exclusive design for an embedded camera 8 is described herein. Therefore, the camera 8 itself is located in the separate compartment 2, and is integrated as a modular device for easy assembly and maintenance. Thus, in order to decrease costs for area wide video observation/surveillance systems within sensitive areas, the present invention provides a system solution embedded inside a street light apparatus. The present invention saves costs by expanding existing infrastructures, due to retrofit kit-type deployment of the apparatus. Knowing that existing street light poles, columns, lamp posts, or brackets are not always in the best vertical and level position for best surveillance, the use of the PTZ camera 8 will overcome those issues by calibration/adjustment on site during installation and later on when operating the system. By preferably using a one-way type glass or polycarbonate camera window 11, passers-by will not be able to detect the camera 8, even when the camera is moving or zooming, thus rendering the surveillance essentially invisible.

Figure 2:
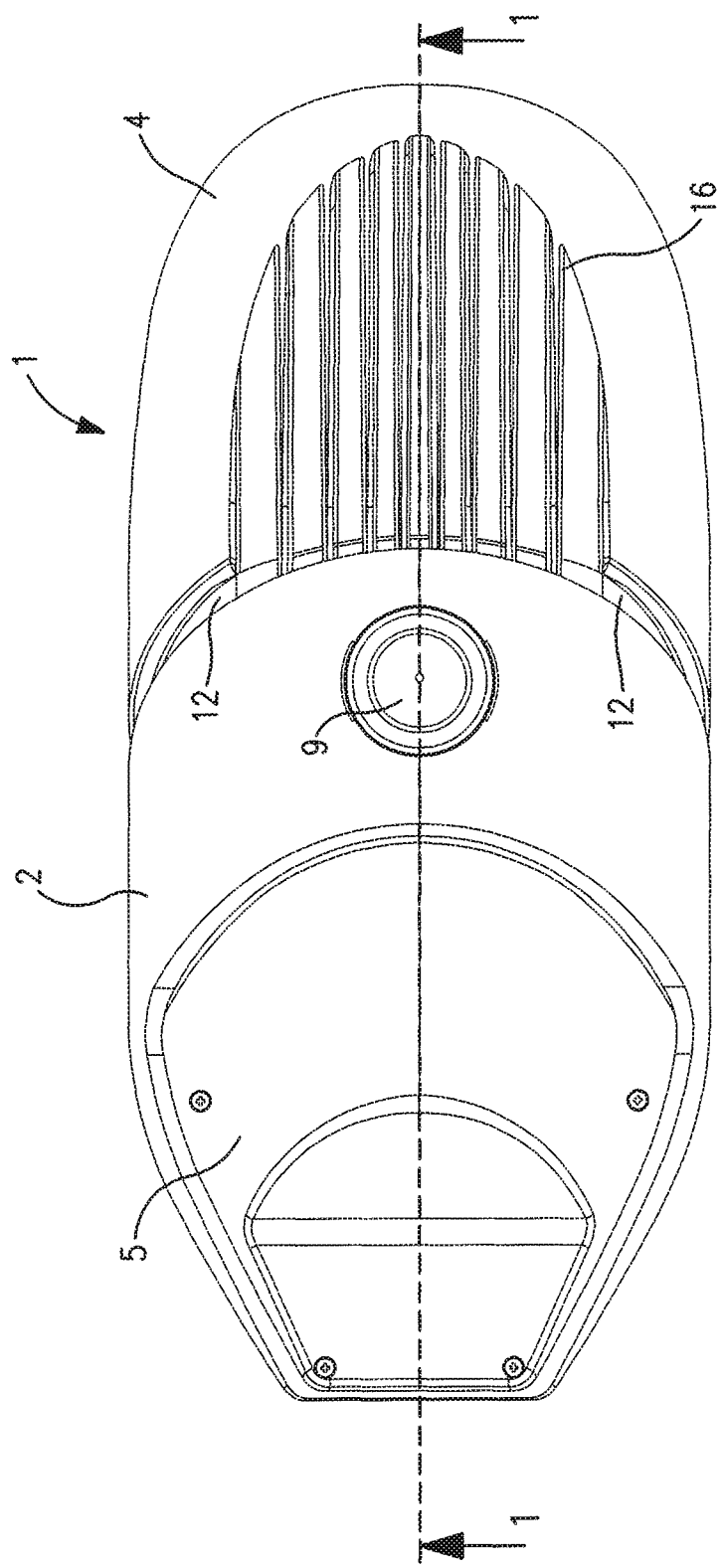
FIG. 2 is a top plan view of the FIG. 1 embodiment.
Figure 3:
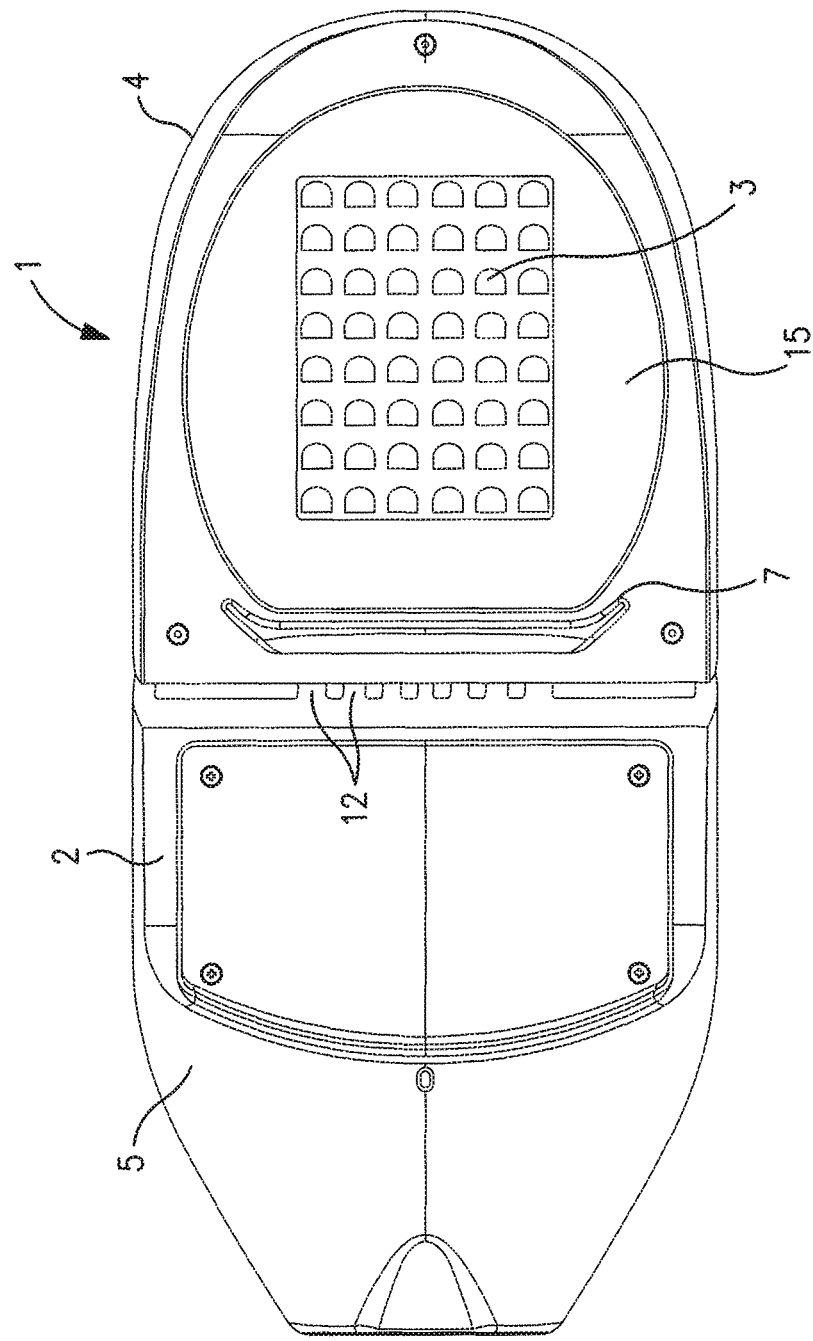
FIG. 3 is a bottom plan view of the FIG. 1 embodiment.
Figure 4:
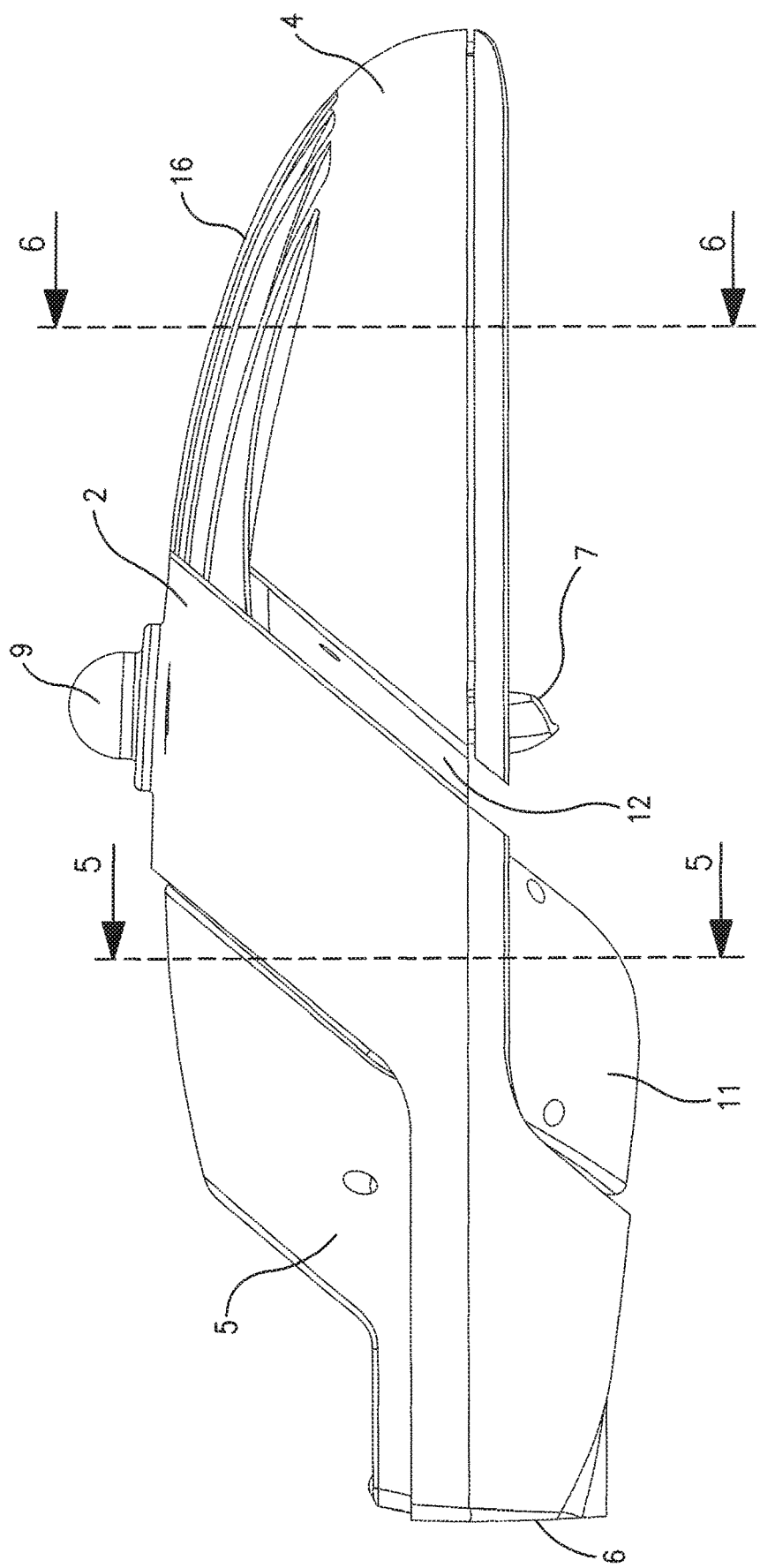
FIG. 4 is a side plan view of the FIG. 1 embodiment.

The LED array 3 is preferably mounted in the compartment 4, separate from the compartment 5 where the LED power supply 30 and other heart-generating components are installed. Alternatively, one or more of these components may be installed in compartment 2. The LED array 3 is preferably made of cast aluminum. The separate compartment 4 is designed to manage the heat developed by the LED array 3, between 30 W and 150 W load power for ambient temperatures from −35 degrees C. to +50 degrees C. The cast aluminum compartment 4 is mechanically and thermally separated from the camera compartment 2 as much as possible (e.g., via thermal insulating screws 13), and contains the passive air cooling section 12, including the top portion thereof 16 (FIG. 2). As best depicted in FIG. 3, the cooling section 12 comprises seven air channels running from the bottom of the section to the top 16, although the number of air channels may vary from one to twenty or more. These air channels may be disposed in parallel, but more preferably are disposed in a fan-type arrangement where they are closer together at the bottom and fan-out as they extend upward toward the top of the enclosure. The compartment 4 is preferably sealed at the bottom via a glass or polycarbonate flat cover 15. The glass or polycarbonate flat cover 15 and corresponding lower edges of the compartment 4 provide a light distribution that is fully cut off against the sky according to the Dark Sky Association standards (reduction of light pollution), although the glass or polycarbonate flat cover 15 provides less glare effect for passers-by or vehicles during night time.

As a matter of redundancy, the local power supply for the lighting control unit 28 is located in the compartment 5 and preferably operates 24 hours a day/7 days a week, generating enough temperature to preheat the LED power supply throughout the daytime. The same redundancy method may be adopted for the camera 8, which should also be in operation 24 hours a day/7 days a week, providing constant live video streams.

The PTZ camera device 8 is preferably a remotely-controlled unit providing live video streams transmitted wirelessly through radio frequencies, and/or a wired LAN (Local Area Network) connection to a central command control facility for display on one or more computers and/or large screen displays. Preferably, live video streams of an individual camera 8 can also be viewed from smart mobile devices such as Smart Phones, iPads, PDAs, laptops, etc. Preferably, the camera 8 triggers alarm information to the command control via video analytics (e.g., face-recognition) software either embedded inside the camera or centrally managed at the command control facility via one or more computers/servers. Also preferably, the camera 8 is electronically addressed via a unique IP address to be defined by the system integration service responsible for the video surveillance system deployment and set up. The present invention thus provides a method for integrating most common PTZ cameras over IP.

Figure 5:
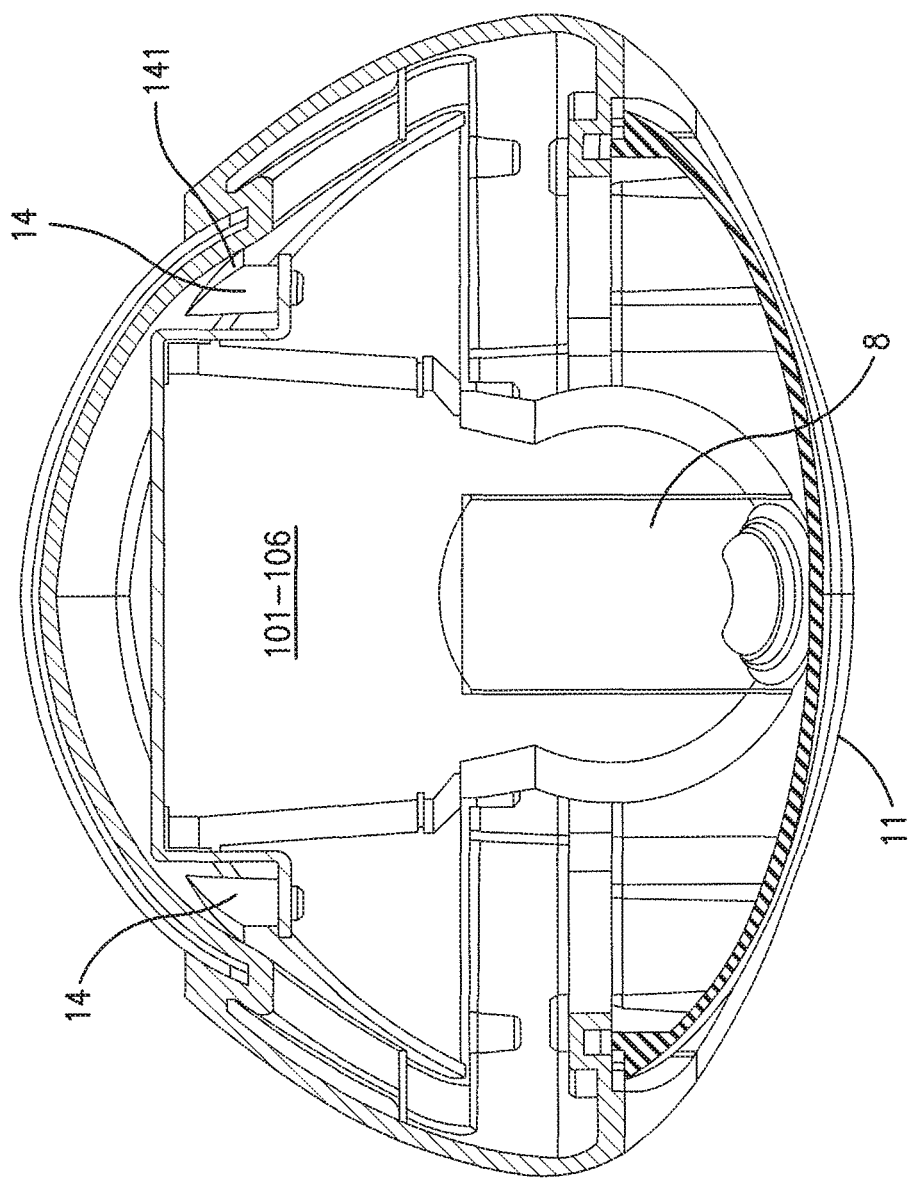
FIG. 5 is a schematic cross-sectional view of the FIG. 1 embodiment taken along line 5-5 of FIG. 4.
Figure 6:
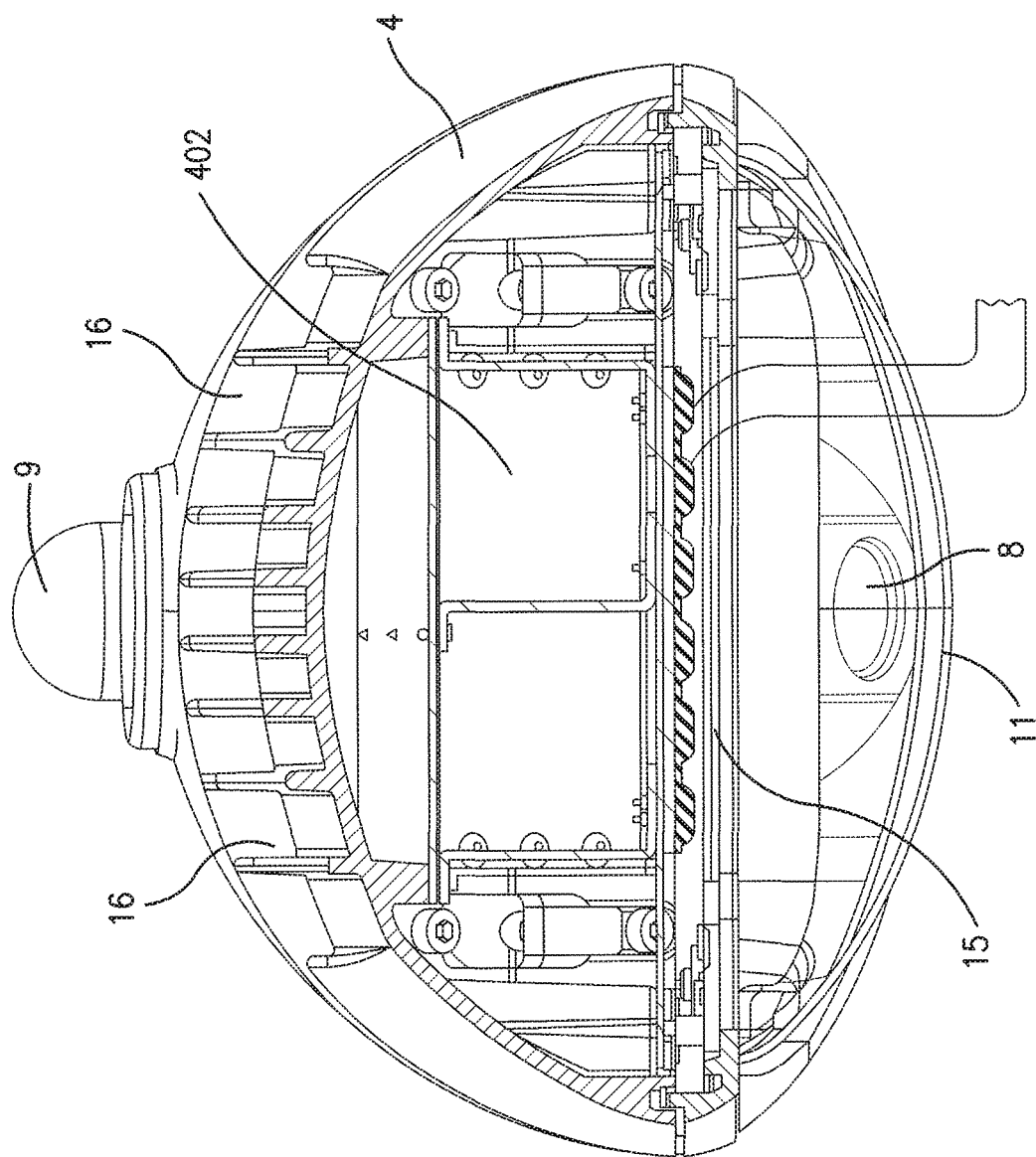
FIG. 6 is a schematic cross-sectional view of the FIG. 1 embodiment taken along line 6-6 of FIG. 4.

Preferably, the camera 8 is mounted via one or more (e.g., four) brackets 14 (FIG. 5) to the compartment 2. In order to mount the camera 8 in a mostly-horizontal, mostly-level position (which may be independent of the street light apparatus 1), tilt (inclination) may be adjusted via the brackets 14, mounted so as to be independently adjustable inside the compartment 2. On the bracket 14, optional heating and/or ventilation (fan) devices may be mounted. These devices may provide an improved temperature environment for the camera device 8 inside compartment 2, and may be autonomously activated (switched on or off) by an embedded temperature sensor 141 also mounted on the bracket 14.

Preferably, the compartment 2 is covered by a glass or polycarbonate camera window 11, which is mounted via screws 251 (FIG. 1) to the compartment enclosure (preferably aluminum).

The present invention also provides a method of removing the camera window 11 via the one or more screws 251 or other attachment devices. After removing the window 11, the camera 8 and the camera brackets 14 can be removed from and inserted into the compartment 2 for maintenance or repair reasons.

Preferably, the compartment 2 houses a radio device 10 (FIG. 1) for broadband wireless communication, such as for example WiFi, WiMax, LTE (Long term evolution) or LTE advanced. The radio device 10 can operate in several modes. Those modes provide the signal to be either amplified, bridged (IP address stays as the origin), routed (IP address is connected to a defined IP address and subnet), or as a client (the IP cam device is asking for an IP address from the radio device (CPE)). The radio device 10 thus may operate either in one or more of Bridge, Repeater, Router, and/or Client mode. The radio device 10 is preferably connected to the radio antenna 9 via high frequency shielded antenna cable and to the camera device 8 via an Ethernet cable. The radio device 10 may not be needed when the camera is connected via LAN (Local Area Network) cable. Preferably, the power for the camera device 8 is supplied via a PoE (Power over Ethernet) connection.

The present invention includes a method of protecting the camera 8 optical lens from reflections and glare effects from the LED array 3 when in operation (preferable during night time), using the anti-glare spoiler 7. The anti-glare spoiler 7 (FIGS. 1 and 3) may be made of ultra violet resistant and radio-frequency-transparent plastic, and may comprise one or more of 433 Mhz, 868 MHz, 916 MHz and/or 2.4 GHz radio antenna(s) connected to the LCU 28.

The compartment 5 may comprise several devices for the apparatus to achieve its desired applications. For example, the LED power supply 30 (FIG. 1) may be installed therein and used to individually control light main voltages, frequencies, and load power, as well as the operating method (e.g., constant current, constant voltage), and one or more dimming interfaces (such as Digital Addressable Lighting Interface (DALI), 0-10V, etc.) according to the relevant electrical standards within the deployment area.

Likewise, the compartment 5 may contain a transformer 205 providing power to the camera 8, the radio device 10, the LCU 28, and/or one or more of the heating and/or cooling (e.g., fan) devices 105, 106 inside the compartment 2. Preferably, the transforming structure 205 will convert main voltage down to 12V, 24V, 5V, 48V, and/or 5V, depending on the camera and equipment used.

The compartment 5 may also contain one or more connection terminals 206 for main voltage, one or more Ethernet connections (when, for example, the camera 8 is connected via wired LAN connection), and individual connectors for low voltage (<50V) power supplies, such as for the camera 8, the heating and cooling devices 105, 106, the radio device 10, and the LCU 28.

Figure 7B:
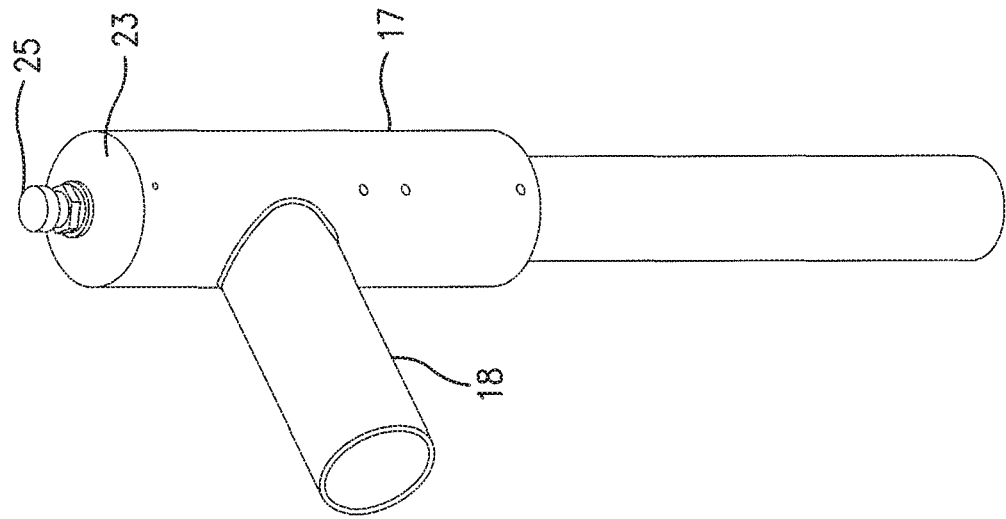
FIGS. 7A and 7B are, respectively, schematic cross-sectional and perspective views of the lamp post connecting adapter for use with the embodiment of FIG. 1.

The LCU 28 preferably functions as an electronic control device providing intercommunication for the remote and/or autonomous street light management functions of the street light apparatus 1. The LCU 28 is preferably connected to a light sensor and GPS antenna 20 (FIG. 7B). The LCU 28 detects and provides communication access to the most commonly used Industrial, Scientific, and Medical (ISM) frequency bands, such as 433 Mhz, 868 MHz, 916 MHz, and/or 254 GHz.

Figure 8:
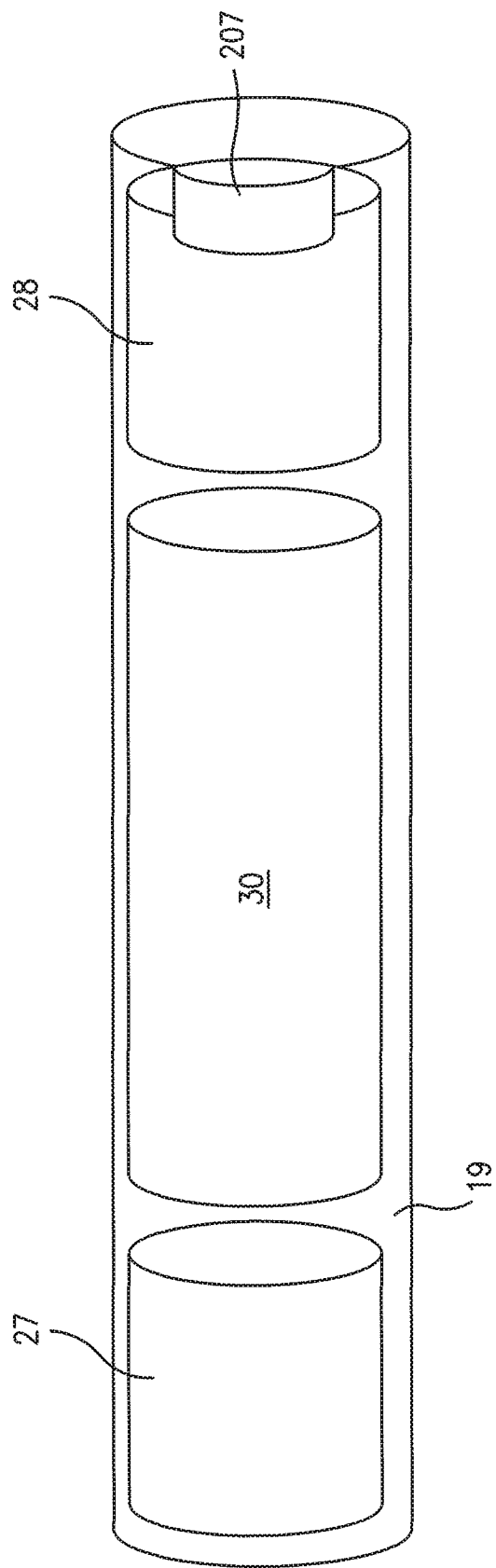
FIG. 8 is a notional, schematic side view of the lamp post electronic devices for use with the FIG. 1 embodiment.
Figure 9:
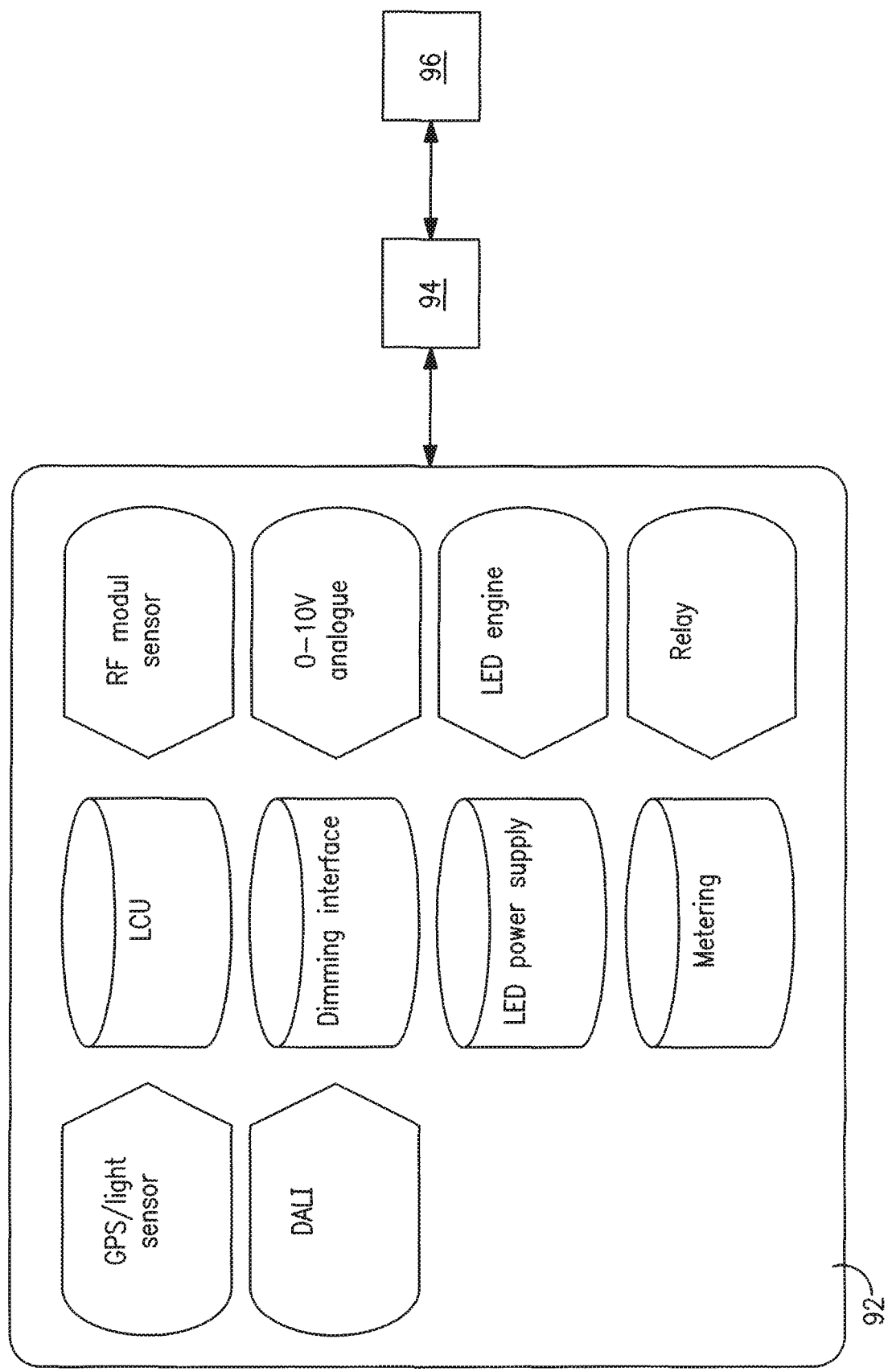
FIG. 9 is a schematic, functional diagram of the electronics for use with the FIG. 1 embodiment.

The compartment 5 may also include a metering and switching electronic device(s) 27 (FIGS. 1 and 8) providing continuous energy metering of the street light apparatus 1 with less than 1% metering tolerance, per ANSI C12.1 (The American National Standards Institute development organization (SDO) for electricity metering includes the American National Standard for Code for Electricity Metering. It describes acceptable in-service performance levels for meters and devices used in revenue metering.) The energy parameters are preferably transmitted through the LCU 28 and logged in a Data Control Unit embedded log file storage at the REMOTE MANAGEMENT CENTER LEVEL 94 or the CORE LEVEL 96 (FIG. 9). Additionally, a relay preferably switches the LED power supply 30 on/off according to remote control commands or a time-table programmed at the REMOTE MANAGEMENT CENTER LEVEL 94 or the CORE LEVEL 96.

The compartment 5 may also have a GPS electronic device 207 coupled to a light sensor/GPS antenna 20 (FIG. 7B), providing the LCU 28 with position coordinates and real time clock information to be transferred to the REMOTE MANAGEMENT CENTER LEVEL 94 or CORE LEVEL 96 (FIG. 9) for visualization.

The mechanical interface 6 (FIGS. 1, 7A, and 7B) may be designed as one or more plug-in units for a typical 60 mm diameter pole or lamp-post brackets, adapters, and/or wall mounted brackets. The fixation of the plug-in tube 18 with the interface 6 is preferably managed by screws pressing the tube against the mechanical interface, as is known in the art. The mechanical interface may be designed to keep the street light apparatus 1 always in the mounted position, taking into consideration the deployment areas calculated, the wind loads, the ambient air environment, and local constraints in terms of vibration, temperature, and humidity. Note that the devices shown in FIGS. 1, 7A, and 7B may be provided as a kit to retrofit existing street lights into street light apparatus according to the present inventions.

Figure 7A:
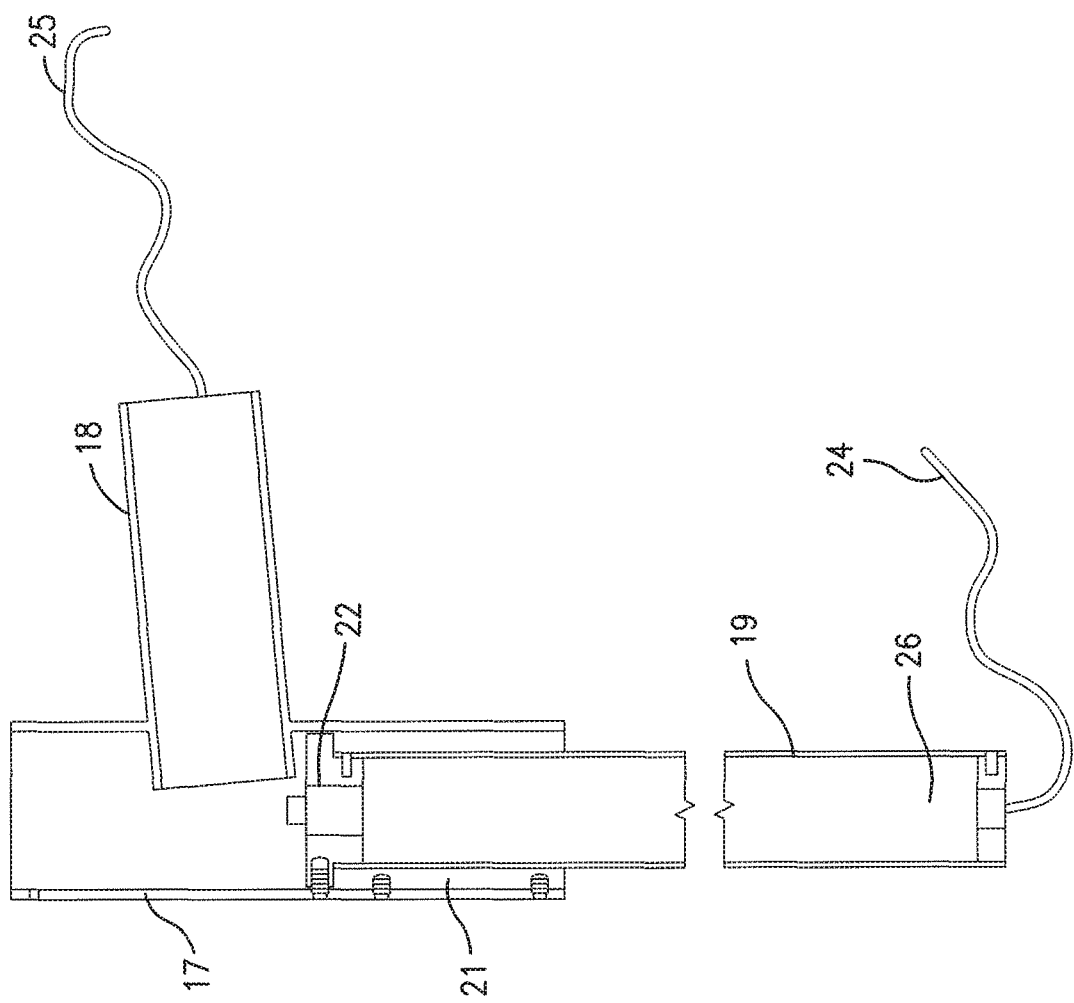

Preferably, a stainless steel mechanical lamp post adapter 17 (FIG. 7B) may be used to couple the apparatus 1 to the lamp post. For mounting reasons, for example, for ambient temperature environments above 50 degrees C., a mechanical lamp post adapter is preferably used. The adapter 17 may be designed as a plug-in unit for 60 mm, 76 mm and/or 89 mm pole top diameters. In order to protect the adapter 17 against twisting on the lamp post (caused by vibration, wind, or any other circumstances), it is preferably fixed to the lamp post by fixing screws 21 (FIG. 7A). The bracket inlet tube 18 (FIGS. 7A and 7B) is preferably designed with a standard inclination (tilt) of about 5 degrees. This should provide the most commonly used inclination (tilt) for most street lights. Any other inclination may be possible on demand. The adapter 17 may contain the lamp post electronic unit 26 embedded in a tubular enclosure 19. The lamp post enclosure 19 is preferably connected via a mechanical interface 22 to the adapter mechanics 17. The top of the adapter mechanics 17 is preferably covered and sealed by the adapter top cover plastic plate 23. The adapter top cover plastic plate 23 may comprise the light sensor and GPS antenna 20, which may be connected to the lamp post electronic 26. Wiring (power and/or signal) 24 may be installed in the tube 19 and may connect with wiring 25, which typically is coupled within the compartment 5 to the above-described electrical interfaces.

The enclosure 19 for the lamp post electronic unit 26 may be made of aluminum and/or plastics, allowing the electrical and mechanical interfaces to be integrated inside the adapter 17. The enclosure 19 preferably attaches inside the existing lamp post tube, providing the lamp post electronics 26 with enhanced cooling performance by the air circulation inside the lamp post itself. Additionally, the enclosure 19 is well protected against any physical impact from the outside (vandalism).

In another embodiment, the lamp post electronic unit 26 (FIG. 7A) may comprise several devices used for apparatus-provided applications. The LED power supply 30 may be installed in one or more portions of the pole mounting structure (FIGS. 7A, 7B, and 8). Likewise, the lamp post electronic unit may also provide one or more transformers providing power to the camera 8, the radio device 10, and the LCU 28. An electronic transformer device may be installed in the pole mounting structure to convert mains voltage down to 12V, 24V, 48V, and/or 5V, as noted above. The pole mounting structure may also house the connection terminals for mains voltage and individual connectors for low voltage (<50V) power supplies such as the camera 8, the heating and cooling device(s) 105, 106, and/or the radio device 10. Likewise, the LCU 28 may be housed on one or more of the pole mounting structures, as well as electronic device(s) for providing intercommunication for the remote and autonomous street light management of the street light apparatus 1. The LCU 28 is preferably connected to the light sensor and GPS antenna 20. The LCU 28 preferably detects and provides communication access to the most commonly used ISM band radio frequencies, such as 433 Mhz, 868 MHz, 916 MHz and/or 2.4 GHz.

In an another embodiment, one or more of the pole mounting structures may include the metering and switching electronic device 27 (FIGS. 7A, 7B, and 8) providing continuous energy metering of the street light apparatus 1. Additionally, the pole mounting structures may house the relay switching the LED power supply 30 on/off, according to a remote control device or a time table programmed at the REMOTE MANAGEMENT CENTER LEVEL 94 or CORE LEVEL 96. Furthermore, the pole mounting structures may house the GPS electronic device 207.

The presently preferred embodiments are preferably active within three physical infrastructure levels: The Field Level 92, the Automation and Aggregation Level 94, and the Remote Management Center Level (or Core Level) 96 (FIG. 9). At the Field Level is the physical structure: the street light(s), the street, the industrial area, and/or or the objects of area lighting, including columns/poles, their electrical supplies, luminaires, sensors, or any devices connected to the physical lighting infrastructure(s). The Internet of Things (smart sensor networks) may use and/or be part of the present invention, as individual communication backbones.

The Automation and Aggregation Level 94 includes, physically, the electrical interface(s) between the energy supply infrastructure and the Field Level structure. Mainly, this includes an electrical cabinet with a data controller providing the street lights with electrical energy, communications, control, and monitoring, preferably through radio frequency communication with all connected devices (e.g., one or more of the apparatus 1). Backbone connectivity is preferably via the internet.

The Remote Management Center Level 96 comprises, physically, a data and operations center to remotely control and monitor any individual device connected to the field- and automation or aggregation levels. The remote management center can either be separated from or embedded into the video observation command control.

5. Conclusion

Thus, what has been described is useful structure and/or methods whereby, e.g., a PTZ camera device is embedded in an LED street light apparatus. Preferably, the embodiments are based on a modular design for illumination, video observation, wireless communication, and electrical and mechanical connectivity, within existing street lighting structure. Notably, an anti-glare spoiler with embedded radio antenna may be provided in preferred embodiments to reduce reflections and direct glare from the LED array to the camera lens. Preferably, a passive cooling system is provided for the street light apparatus. Thermal management preferably includes the thermal separation of the LED compartment, the camera compartment, and the compartment for gears and drives. Preferably, live stream video observation is provided using the camera mounted inside the LED street light apparatus at a location being monitored remotely.

The individual components shown in outline or designated by blocks in the attached Drawings are all well-known in the debt settlement arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An LED street light, comprising:
a first compartment having an LED array configured to illuminate an area beneath the street light;
a second compartment, coupled to the first compartment, having a camera directed toward the area beneath the street light, the second compartment also having a window covering the camera such that the camera can receive light from area beneath the street light, but passers-by in the area beneath the street light do not see the camera, a camera lens being disposed vertically below a plane of the LED array;
a third compartment, coupled to the second compartment, and configured to attach the street light to a vertical support; and
a passive air channel separating the first compartment from and the second compartment, and configured to direct air from the area beneath the street light to an area above the street light to enhance thermal insulation between the first compartment and the second compartment, each of the first compartment and the second compartment being weatherproofed, at least with respect to the air channel, wherein a power supply for the LED array is disposed in one of the second compartment and the third compartment;
heat management structure configured to reduce light output of the LED array in response to an increase in temperature in the first compartment;
shield structure mounted on a bottom of the street light and configured to prevent light from the LED array from entering the camera lens, and to guide air into the passive air channel; and
an antenna mounted on the top of the street light and configured to transmit and receive signals, the transmitted signals including image signals and the received signals including control signals.

2. An LED street light, comprising:
a first compartment having an LED array configured to illuminate an area beneath the street light;
a second compartment, coupled to the first compartment, having a camera directed toward the area beneath the street light;
a third compartment, coupled to the second compartment, and configured to attach the street light to a vertical support; and
a passive air channel disposed between the first compartment and the second compartment, and configured to passively direct air from the area beneath the street light to an area above the street light, to enhance thermal insulation between the first compartment and the second compartment, each of the first compartment and the second compartment being weatherproofed, at least with respect to the air channel;
heat management structure configured to reduce light output of the LED array in response to an increase in temperature in the first compartment;
shield structure mounted on a bottom of the street light and configured to prevent light from the LED array from entering the camera lens, and to guide air into the passive air channel; and
an antenna mounted on the top of the street light and configured to transmit and receive signals, the transmitted signals including image signals and the received signals including control signals.

3. The LED street light according to claim 2, wherein a power supply for the LED array is disposed in one or more of the second compartment and the third compartment.

4. The LED street light according to claim 2, further comprising at least one antenna coupled to the second compartment and configured to transmit one or more images from the camera.

5. The LED street light according to claim 2, further comprising at least one antenna coupled to the attachment structure and configured to transmit one or more images from the camera.

6. The LED street light according to claim 2, wherein the camera comprises a pan-tilt-zoom camera.

7. A camera-equipped LED streetlight, comprising:
an LED light compartment having an array of LED lights disposed to direct light to an area to be observed;
a camera compartment coupled to, but thermally insulated from, the LED light compartment, the camera compartment having a camera with a lens that is (i) disposed vertically below said array of LED lights, and (ii) disposed to capture an image from the area to be observed;
a power supply compartment coupled to at least one of the LED light compartment and the camera compartment, the power supply compartment configured to support a power supply of said array of LED lights; and
a passive cooling air channel disposed between the LED light compartment and the camera compartment to enhance thermal insulation between the first compartment and the second compartment, each of the first compartment and the second compartment being weatherproofed, at least with respect to the air channel;

heat management structure configured to reduce light output of the array of LED lights in response to an increase in temperature in the LED light compartment; and wireless communications apparatus configured to communicate with a remote station, wherein camera control signals, camera images, and LED information are enabled to be communicated to the remote station over the wireless communications apparatus.

8. The LED street light according to claim 7, wherein the passive cooling air channel slopes at an angle from a bottom of the streetlight to a top thereof.

9. The LED street light according to claim 7, further comprising a shield device vertically oriented between the LED light compartment and the camera compartment, and configured to (i) block light from the array of LED lights from reaching the camera lens, and (ii) direct air into the cooling air channel.

10. The LED street light according to claim 7, wherein the camera compartment is disposed between the LED light compartment and the power supply compartment, and further comprising a light pole connection mechanism configured to couple the LED streetlight to a vertical light pole.

11. The LED street light according to claim 7, further comprising a light control unit disposed in at least one of the camera compartment and the power supply compartment.

12. The LED street light according to claim 7, wherein the power supply compartment is heavier than the camera compartment, and wherein the camera compartment is heavier than the LED light compartment.

13. The LED street light according to claim 7, further comprising at least one antenna configured to (i) receive commands from a remote center, and (ii) transmit plural captured images from the camera to the remote center.

14. Streetlight-mounted camera apparatus, comprising:
an enclosure having an LED light module, a camera module, and a power supply module, the camera module being separated from the LED light module by at least on passive air cooling channel extending from a bottom of the enclosure to a top thereof, the passive air cooling channel enhancing thermal insulation between the LED light module and the camera module, each of the LED light module and the camera module being weatherproofed, at least with respect to the air channel;

the LED light module having an array of LED lights disposed to provide light onto an area below the streetlight, an LED light power supply being disposed in at least one of the camera module and the power supply module;

the camera module supporting a camera having a lens disposed vertically below a plane of the LED array; and heat manager structure for controlling light from the LED light module in accordance with a temperature in the LED light module.

15. The apparatus according to claim 14, further comprising shield structure mounted on a bottom of the enclosure and configured to prevent light from the LED array from entering the camera lens.

16. The apparatus according to claim 14, further comprising an antenna mounted on the top of the enclosure and configured to transmit and receive signals, the transmitted signals including image signals and the received signal including control signals.

17. The apparatus according to claim 14, further comprising a radio transmitter, a radio receiver, at least one processor, and at least one memory disposed within at least one of the camera module and the power supply module.

18. The apparatus according to claim 14, further comprising a camera lens shield configured to pass incoming light to the camera lens but to render the camera lens substantially invisible from outside of the enclosure.

19. The apparatus according to claim 14, further comprising (i) wireless communications structure configured to communicate with a remote station, and (ii) wired communications structure configured to communicate with the remote station, and wherein camera control signals, camera images, and LED information are enabled to be communicated to the remote station over at least one of the wireless communications structure and the wired communications structure.

20. The apparatus according to claim 14, further comprising a fan for forced convection of air from the LED module to the camera module.

21. A kit comprising the apparatus of claim 14.

22. A method of imaging a lighted area from a streetlight, comprising:
illuminating an area below the streetlight with an LED light array disposed in an LED light compartment of an enclosure;

capturing an image of the illuminated area below the streetlight with a camera mounted in a camera compartment coupled to the LED light compartment;

supporting the enclosure to a vertical support;

cooling the LED light compartment by providing at least one passive cooling air channel between the LED light compartment and the camera compartment, from a bottom of the enclosure to a top thereof, the at least one passive cooling air channel enhancing thermal insulation between the LED light compartment and the camera compartment, each of the LED light compartment and the camera compartment being weatherproofed, at least with respect to the air channel;

shielding light from the LED array from entering a lens of the camera using a shield device, and using the shield device to guide air into the passive cooling air channel;

providing power to the LED light array and to the camera from circuitry disposed in a power supply compartment of the enclosure;

heat-managing light output of the LED light array in accordance with a temperature in the LED light compartment; and providing an antenna mounted on the top of the streetlight, configured to transmit and receive signals, the transmitted signals including image signals and the received signals including control signals.

* * * * *